US007945237B2

(12) United States Patent
Patil et al.

(10) Patent No.: US 7,945,237 B2
(45) Date of Patent: May 17, 2011

(54) METHODS AND SYSTEMS FOR TRACKING WIRELESS DEVICES

(75) Inventors: Prathap Patil, Gahanna, OH (US);
Ramgopal V. Gollakota, Naperville, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1401 days.

(21) Appl. No.: 09/790,677

(22) Filed: Feb. 23, 2001

(65) Prior Publication Data
US 2002/0034941 A1 Mar. 21, 2002

Related U.S. Application Data

(60) Provisional application No. 60/185,025, filed on Feb. 25, 2000.

(51) Int. Cl.
*H04M 11/00* (2006.01)
*H04M 1/66* (2006.01)
*H04M 3/42* (2006.01)
*H04M 3/00* (2006.01)
*H04W 4/00* (2009.01)
*H04W 24/00* (2009.01)
*H04B 7/00* (2006.01)

(52) U.S. Cl. ........ 455/405; 455/406; 455/409; 455/410; 455/414.1; 455/417; 379/114.17; 379/202.01; 340/7.22; 340/990; 715/758; 709/203

(58) Field of Classification Search .................. 455/423, 455/57, 522, 539, 410, 574, 426, 417, 404, 455/414, 466, 457, 433, 436, 405, 406, 409, 455/418, 414.1; 379/34, 114.17, 202.01; 340/539, 990, 7.22; 709/203; 342/465; 345/751; 715/758; 370/990

See application file for complete search history.

(56) References Cited

U.S. PATENT DOCUMENTS

| 5,155,759 | A | * | 10/1992 | Saegusa et al. | |
| 5,248,929 | A | * | 9/1993 | Burke | |
| 5,428,667 | A | * | 6/1995 | Easterling et al. | 455/410 |
| 5,583,918 | A | * | 12/1996 | Nakagawa | 455/409 |
| 5,625,669 | A | * | 4/1997 | McGregor et al. | 455/418 |
| 5,631,947 | A | * | 5/1997 | Wittstein et al. | 379/114.17 |
| 5,708,417 | A | * | 1/1998 | Tallman et al. | 340/539 |
| 5,729,589 | A | * | 3/1998 | Samson | 379/34 |
| 5,819,171 | A | * | 10/1998 | Hoogerwerf et al. | 455/410 |
| 5,850,599 | A | * | 12/1998 | Seiderman | 455/406 |
| 5,918,160 | A | * | 6/1999 | Lysejko et al. | 455/57 |
| 5,924,016 | A | * | 7/1999 | Fuller et al. | 379/202.01 |
| 5,963,870 | A | * | 10/1999 | Chheda et al. | 455/522 |
| 6,067,460 | A | * | 5/2000 | Alanara et al. | 455/574 |
| 6,088,594 | A | * | 7/2000 | Kingdon et al. | 455/457 |
| 6,175,308 | B1 | * | 1/2001 | Tallman et al. | 340/539 |
| 6,181,935 | B1 | * | 1/2001 | Gossman et al. | 455/433 |
| 6,199,099 | B1 | * | 3/2001 | Gershman et al. | 709/203 |
| 6,243,574 | B1 | * | 6/2001 | McGregor et al. | 455/418 |
| 6,301,474 | B1 | * | 10/2001 | Hartmaier et al. | 455/417 |
| 6,311,060 | B1 | * | 10/2001 | Evans et al. | 455/426 |
| 6,330,454 | B1 | * | 12/2001 | Verdonk | 455/456.2 |
| 6,408,172 | B1 | * | 6/2002 | Alperovich et al. | 455/404 |
| 6,466,783 | B2 | * | 10/2002 | Dahm et al. | 455/414 |
| 6,480,121 | B1 | * | 11/2002 | Reimann | 340/990 |
| 6,512,930 | B2 | * | 1/2003 | Sandegren | 455/518 |

(Continued)

*Primary Examiner* — William D Cumming
(74) *Attorney, Agent, or Firm* — Capitol Patent & Trademark Law Firm, PLLC

(57) ABSTRACT

The presence and location (among other things) of wireless devices is tracked in order to enable the use of special services, such as wireless instant messaging. Both conventional and WAP-enabled wireless devices may be so tracked.

28 Claims, 3 Drawing Sheets

U.S. PATENT DOCUMENTS

| | | |
|---|---|---|
| 6,516,200 B1 * | 2/2003 | Schmidt et al. |
| 6,545,589 B1 * | 4/2003 | Fuller et al. .................. 340/7.22 |
| 6,594,492 B2 * | 7/2003 | Choi et al. .................... 455/436 |
| 7,058,386 B2 * | 6/2006 | McGregor et al. ............ 455/405 |
| 2002/0034941 A1 * | 3/2002 | Patil et al. ..................... 455/423 |
| 2002/0075304 A1 * | 6/2002 | Thompson et al. ........... 345/751 |
| 2002/0098855 A1 * | 7/2002 | Hartmaier et al. ............ 455/466 |
| 2006/0070003 A1 * | 3/2006 | Thompson et al. ........... 715/758 |

\* cited by examiner

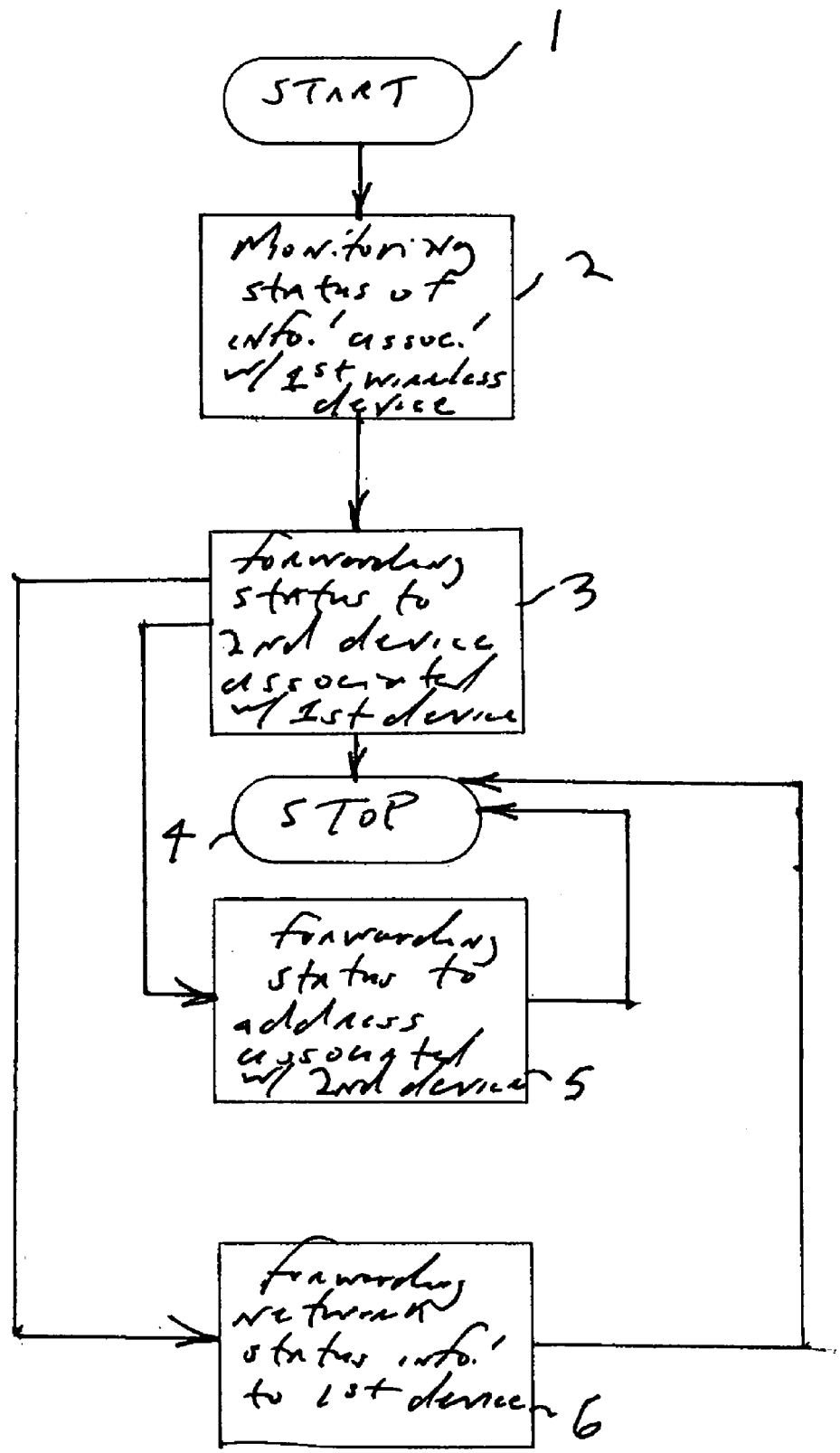

METHODS AND SYSTEMS FOR TRACKING WIRELESS DEVICES

The present application claims the benefit of priority of co-pending provisional patent application no. 60/185,025 filed Feb. 25, 2000, the disclosure of which is hereby incorporated by reference.

BACKGROUND OF THE INVENTION

Those who are frequent users of the Internet will recognize the phrase "instant messaging". Generally speaking, instant messaging allows one person (the "sender") to communicate with another (the "recipient") without having to enter the e-mail address of the recipient. Usually, the sender selects an intended recipient from a list of possible recipients (the list is sometimes referred to as a "buddy list"). To date, the vast majority of instant messaging services are aimed at "wired" users. That is, in order to make use of an instant messaging service, both the sender and the recipient must be connected physically or otherwise hard-wired to one or more networks. Typically, this is accomplished when both the sender and recipient are sitting behind their personal computers which are linked together through one or more Internet Service Providers and local exchange carriers (e.g., data or telephone companies). Provided the sender and recipient are so hard-wired, both can participate in the transmission and reception of instant messages.

Our world, however, is quickly becoming "wireless". Increasingly, we are communicating with one another using wireless devices, such as cellular telephones, personal digital assistants (PDAs) or pagers, to name just a few examples. It is believed that instant messaging will become increasingly popular among those people who are using wireless devices as well. Providing such a capability will allow users of wireless devices to send instant messages to other wireless and wired device users.

One of the challenges in providing a wireless, instant messaging capability is tracking the presence, absence, location and other information (collectively referred to as "Estatus") associated with a wireless device (and its user).

Accordingly, it is desirable to provide for methods, systems and devices for tracking wireless devices.

It is further desirable to provide methods, systems and devices for tracking wireless devices in order to provide a wireless, instant messaging capability.

Other desires related to the present invention will become apparent to those skilled in the art from the following description, taken in conjunction with the accompanying drawings and claims.

SUMMARY OF THE INVENTION

In accordance with the present invention there are provided methods, systems and devices for tracking conventional and WAP-enabled wireless devices.

To do so, the invention envisions a system which comprises a tracking unit adapted to monitor the status of a "first" wireless device. Thereafter, the system may also forward status information associated with the first wireless device to a "second" device.

The status information which is tracked and forwarded comprises information selected from a group consisting of: a wireless identification number, an electronic serial number, a time of connection, a time of disconnection, a wireless switch identification number and a serving cell identification number, or some combination of the above.

The status information is not forwarded to just any arbitrary, second device. Rather, the information is only forwarded to a second device in accordance with a service associated with the first device. For example, the information may only be forwarded to a device which is associated with a subscription service or the like which has been paid for by a user of the first device.

In addition to monitoring and forwarding the status of a first wireless device, the present invention also envisions monitoring and forwarding network status information from a second device back to the first device. This two way monitoring and forwarding enables the provisioning of services such as wireless instant messaging.

The present invention and its advantages can be best understood with reference to the drawings, detailed description of the invention and claims that follow.

BRIEF DESCRIPTION OF THE DRAWINGS

FIG. 3 depicts a block diagram of a method for monitoring and forwarding status information of a wireless device according to one embodiment of the present invention.

DETAILED DESCRIPTION OF THE INVENTION

Figure 1:
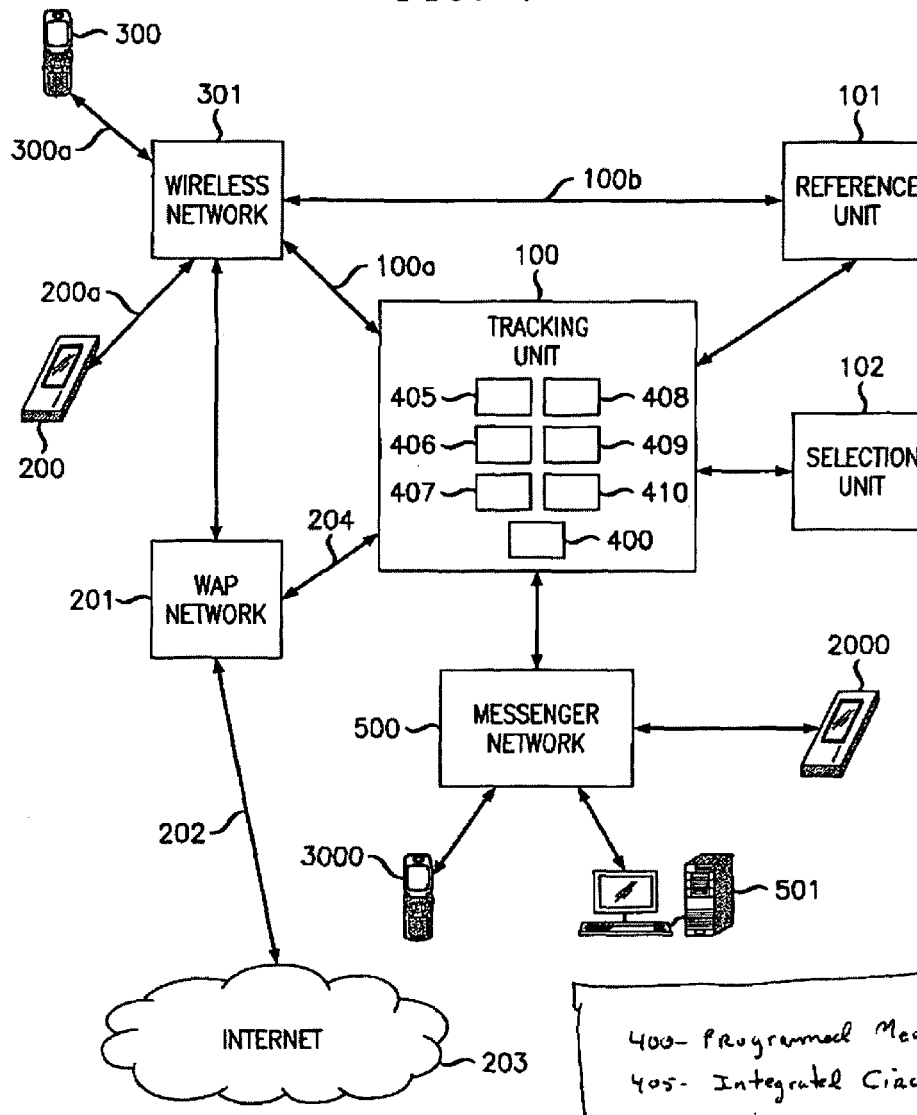
FIG. 1 depicts a method, system and device for tracking wireless devices according to one embodiment of the present invention.

Referring to FIG. 1, there is shown a method, system and device for tracking wireless devices 200, 300 according to one embodiment of the present invention. More specifically, there is shown a tracking unit 100 connected to a wireless application protocol ("WAP") network 201, wireless network 301, reference unit 101, selection unit 102 and messenger network 500.

In one embodiment of the present invention, the tracking unit 100 is adapted to track the presence, absence and location (among other things) of the wireless devices 200, 300. As depicted in FIG. 1, the tracking unit 100 is capable of tracking conventional wireless devices 300 (e.g., TDMA or CDMA-based, wireless devices, and cellular telephones) as well as other, newer devices such as WAP-enabled devices 200. It should be understood, however, that newly introduced cellular telephones, personal digital assistants ("PDAs") and personal computers ("PCs") (e.g. laptop computers with wireless data access) may be considered conventional wireless devices 300 or WAP-enabled wireless devices 200.

The following explanation will illustrate the operation of the tracking unit 100 according to one embodiment of the present invention. At some instant of time, a user of a wireless device 200, 300 decides to connect to network 301. To do so, the user powers on her wireless device 200, 300. Thereafter, a link is created between the device 200, 300 and network 301.

When a conventional wireless device 300 is linked to network 301, the tracking unit 100 is adapted to detect the status of the unit via link 100a. Similarly, when a WAP-enabled wireless device 200 is linked to network 301, the tracking unit 100 is adapted to detect its status. In an alternative embodiment of the present invention, the tracking unit 100 may be adapted to detect the status of the WAP-enabled device 200 via link 204 once the device 200 has "invoked" (i.e., selected) a browser within WAP-enabled network 201.

It should be understood that although only one conventional or WAP-enabled wireless device 200, 300 is shown in FIG. 1, any number of wireless devices 200, 300 may be tracked by the tracking unit 100.

In an illustrative embodiment of the present invention, the user of wireless device 200, 300 is a part of a group of people who like to talk or otherwise communicate with each other. They may be a part of a buddy list or a so-called "chat group". Such a group may comprise wired devices 501, such as personal computers and other conventional wired devices, wireless devices and WAP-enabled wireless devices 2000, 3000 associated with a downstream, messenger network 500. Though only one of each device 501, 2000, 3000 is shown in FIG. 1, it should be understood that any number of wired devices 501 and wireless devices 2000, 3000 may be part of such a chat group.

Continuing with our explanation of how the tracking unit 100 operates, it should be understood that the tracking unit 100 is adapted to continuously track the status of the wireless device 200, 300. We will refer to this device as a "first" wireless device to avoid confusion during the explanation which follows.

In a further embodiment of the present invention, when the first wireless device comprises a conventional wireless device 300, substantially at the same time that the tracking unit 100 detects the presence of the first wireless device 300 within network 301, a reference unit 101 may be adapted to receive a signal via link 100b from network 301. The signal received by reference unit 101 may comprise a wireless identification number, electronic serial number, serving area identification number, mobile switching center ("MSC") address, and location area/cell sector to name just a few. All of this information is associated with the status of device 300. One example of a reference unit 101 is a Home Location Register ("HLR") or the like.

The reference unit 101 is adapted to store a listing of all conventional, WAP-enabled or other wireless devices 200, 300 which are authorized to use network 301. In addition, the reference unit 101 is adapted to store a listing of all of the services (e.g., short message service ("SMS"), instant messaging, call waiting, and WAP-enabled services) users of devices, 200, 300 have subscribed to (i.e., paid for).

Upon receiving a signal associated with a first wireless device 200, 300, the reference unit 101 is adapted to compare this signal with its list of authorized wireless devices and services. Thereafter, the reference unit 101 is adapted to send status information associated with the first wireless device 200, 300 to the tracking unit 100.

In an illustrative embodiment of the present invention, the status information sent by the reference unit 101 comprises information selected from a group comprising: a wireless identification number, an electronic serial number, a time of connection/disconnection, an identification number of the wireless network 301 or one of its associated switches and the identification number of a serving cell (not shown) within network 301 or some combination of the above. Subsequently, tracking unit 100 is adapted to receive and store this information. This allows the tracking unit 100 to identify the first wireless device 200, 300 and to update the status of the first wireless device 200, 300.

The reference unit 101 is adapted to receive status information from the wireless network 301 concerning both conventional 300 and WAP-enabled 200 wireless devices and to forward the status of such devices 200, 300 on to the tracking unit 100. Under certain circumstances a WAP-enabled device 200 may be detected by unit 100 when the device 200 invokes a browser within WAP-enabled network 201. In this case, unit 100 may be adapted to receive a unique signal which identifies device 200 (hereafter "WAP-enabled device ID"). Upon receiving this WAP-enabled device ID, the tracking unit 100 is adapted to update the status of device 200 whose previous status may be stored by tracking unit 100.

It should be understood that after the tracking unit 100 updates a device's 200, 300 status, it is further adapted to store this status. At any given time the tracking unit comprises the status of at least all of the devices 200, 300 connected to at least networks 201, 301. Alternatively, the tracking unit 100 may store the status of other devices, such as those associated with messenger network 500.

Though shown as two separate units, it should be understood that the tracking unit 100 and reference unit 101 may be combined into a single unit or further broken down into additional units. However, it is desirable to keep the tracking unit 100 separate from the reference unit 101 in order to assure that critical subscriber/user information contained within the reference unit 101 is not corrupted by errors associated with the tracking unit 100.

Collectively, the steps described above carried out by the tracking unit 100 and reference unit 101 can be referred to as "monitoring the status" of the first wireless device 200, 300.

Backtracking a little bit, it should be understood that the wireless network 301 shown in FIG. 1 is greatly simplified. Such a network may be made of many different components such as MSCs and wireless or cellular "cells", to give just a few examples.

Up until now, we have assumed that the tracking unit 100 comprises a physical piece of hardware, such as an electronic device or some sort. Though this may be the case, it should be understood that the tracking unit 100 may also comprise a programmed medium 400, such as one or more magnetic tapes, floppy disks, CDs, digital storage devices or the like which are adapted to store a program or programs written in a code known in the art. In the event the tracking unit 100 comprises such a programmed medium 400, the medium is adapted to carry out all of the features and functions of the tracking unit described above and below.

Alternatively, one or more mediums (referred to collectively as "medium") may be adapted to carry out all of the features and functions of the reference unit 101 and selection unit 102 as well.

In addition, the unit 100 (as well as 101-102) may comprise one or more combinations of integrated circuits 405, microprocessors 406, digital signal processors 407, memory 408, receivers 409, transmitters 410 and/or other devices adapted to carry out the features and functions of the present invention.

In addition to monitoring the status of wireless devices 200, 300, the tracking unit 100 can be further adapted to forward some or all status information associated with a particular device or devices 200, 300 to a device 501, 2000, 3000 or to an address associated with a device 501, 2000, 3000 which is a part of a messenger network 500. Whether sent to an address associated with a device 501, 2000, 3000, or to a device itself, both the address and device will be referred to collectively as a "second device". When the tracking unit 100 forwards status information on to an address associated with a second device such an address may comprise an Internet Protocol address or an SS7 ("Signaling System 7") address, for example.

In an illustrative embodiment of the present invention, the second devices may comprise wired, wireless or WAP-enabled wireless devices 501, 2000, 3000 making up a buddy or chat group which includes the first wireless device 200, 300. As discussed more below, it should be understood that the tracking unit 100 will only forward status information on to a second device if the user of the wireless device 200, 300 has subscribed to a service which necessitates the involvement of a second device embedded within, or associated with, network 500.

It should be further understood that the network 500 is overly simplified and may comprise a number of wired, wireless, WAP-enabled or Internet networks necessary to connect a second device to the tracking unit 100.

We have mentioned that the wireless devices 200, 300 and 2000, 3000 may be conventional or WAP-enabled wireless devices. It should be further understood that these devices may comprise either wireless voice or wireless data devices. An example of a wireless voice device is a SMS cellular telephone, while examples of a wireless data devices are WAP-enabled, cellular telephones, PDAs and pagers. Further, it should be understood that these devices 200, 300 and 2000, 3000 may comprise a combination of voice or data devices as well.

One component shown in FIG. 1 which has not yet been discussed is the selection unit 102. In one embodiment of the present invention, the unit 102 is adapted to select those second devices (e.g., within network 500), if any, who are to receive status information from the tracking unit 100.

In more detail, at some point the selection unit 102 is adapted to receive the status of a device 200, 300 and is then adapted to query its memory (e.g., look-up table). In one scenario, if a user of device 200, 300 has not subscribed to a service (e.g., a chat group or the like), the unit 102 is adapted to control the tracking unit 100 so that no status information is sent by the tracking unit 100 to a second device.

In a second scenario, the user has subscribed to a service. In this embodiment, the unit 102 is adapted to permit the tracking unit 100 to forward status information associated with the first device 200, 300 to a second device in accordance with a service associated with the first device 200, 300.

In this manner, the tracking unit 100 is able to correctly link the user of a device 200, 300 to people and services she expects to be linked to (hereinafter referred to as "user preferences"). It can be said that the tracking unit 100 is adapted to the forward status information to a second device based on stored user preferences.

It should be understood that the second device may comprise many different and varied "devices" over and above those already mentioned (i.e., wired and wireless devices 501, 2000, 3000). For example, such a device may comprise an application or client server, an applications program stored on a server or the like, or an address associated with a server or program, to name just a few. It should be further understood that though the singular form of the word device is used, the words "second devices" mean one or more devices.

As before, the selection unit 102 and tracking unit 100 may be combined into one unit or further broken down into additional units.

Though up to now the discussion above has focused on tracking and forwarding the status of wireless device 200, 300, the present invention is not so limited.

Figure 2:
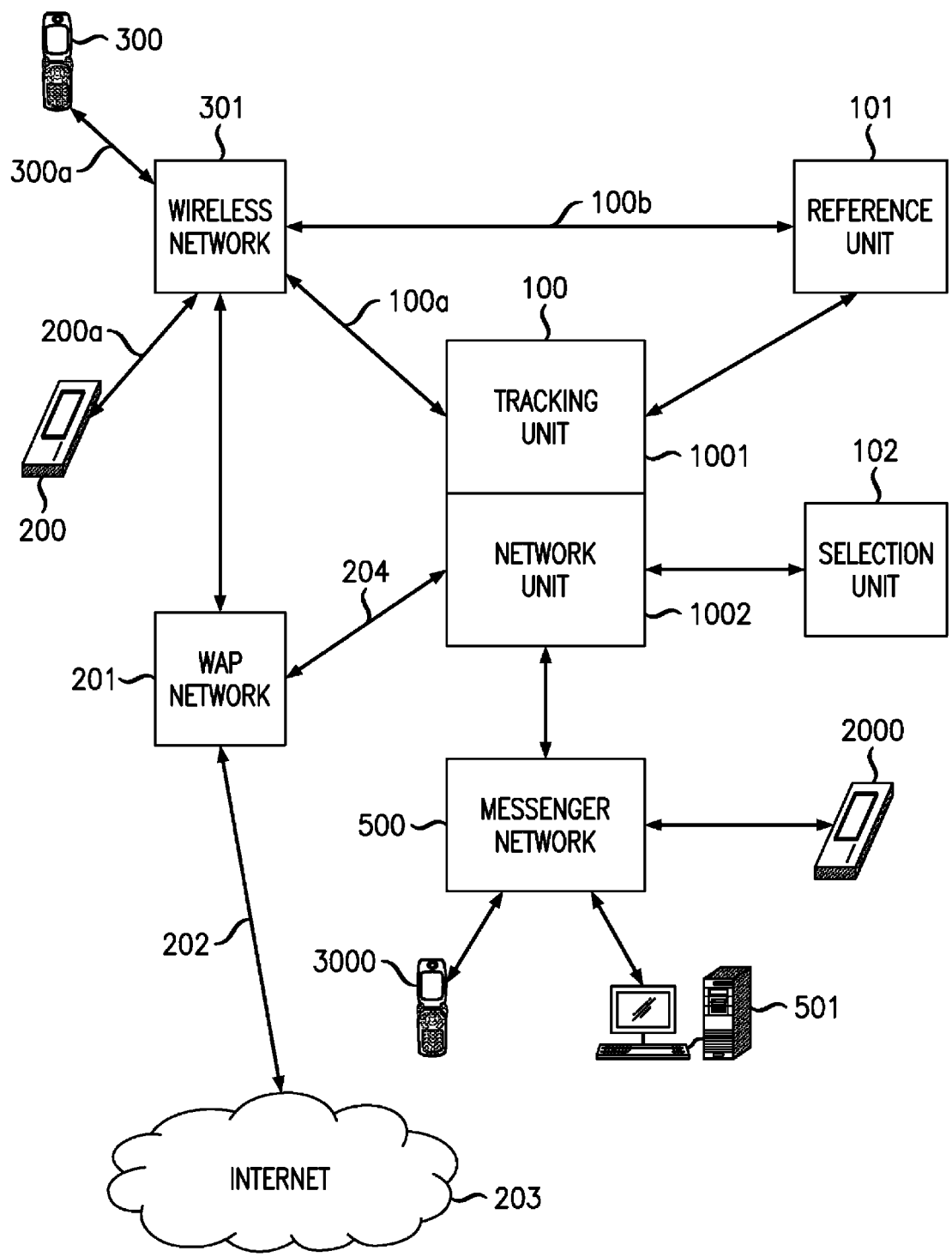
FIG. 2 depicts a method, system and device for tracking devices according to another embodiment of the present invention.

In order to realize services such as instant messaging or wireless instant messaging, the tracking unit 100 may be combined with additional units which are adapted to track the status of a second device, (e.g., those devices making up a chat group). Referring to FIG. 2, there is shown an embodiment which comprises both a tracking unit 1001 and a network unit 1002. The balance of FIG. 2 comprises units and devices similar to those in FIG. 1.

In an illustrative embodiment of the present invention, the network unit 1002 is adapted to monitor and forward network status information associated with a second device to the first wireless device 200, 300. The network status information typically comprises information concerning those devices or users who are logged on to network 500 ("log on information") and who have subscribed to the same service (e.g., are a part of the same buddy or chat group) as the user of the first wireless device 200, 300.

The presence of a tracking unit 1001 and network unit 1002 allows for communications in both directions; from the first wireless device 200, 300 to a second device and from the second device to the first wireless device 200, 300.

This two-way monitoring and forwarding of status information is a pre-requisite in order to offer services such as wireless instant messaging and the like. Consistent with other comments made above, the units 1001, 1002 may be combined or further broken down into additional units.

FIG. 3 depicts a block diagram of the monitoring and forwarding steps discussed above.

It should be understood that changes and variations may be made without departing from the spirit and scope of the present invention. For example, the wireless network 301 may comprise any one of a number of networks, each utilizing slightly different protocols. For example, the network 301 may comprise a network based on the Global System for Mobile communications ("GSM"), an international protocol.

Further changes and variations may be made without departing from the spirit and scope of the present invention as defined by the claims that follow.

The invention claimed is:

1. A method for monitoring a wireless device comprising:
   monitoring status information associated with a first end-user wireless application protocol (WAP) enabled device, said first device comprising a browser;
   forwarding the status information to a second end-user wired device in accordance with an end-user subscription service associated with the first end-user WAP-enabled device provided the second end-user wired device subscribes to the same subscription service as the first end-user WAP-enabled device, wherein the status information comprises a WAP enabled device identification.

2. The method as in claim 1 wherein the status information further comprises information selected from a group consisting of some combination of: an electronic serial number, a time of connection, a time of disconnection, a wireless switch identification number and a serving cell identification number.

3. The method as in claim 1 further comprising forwarding the status information to an address associated with the second end-user device.

4. The method as in claim 1 wherein the step of forwarding the status information comprises forwarding the status information to a second end-user, wireless device.

5. The method as in claim 1 further comprising forwarding network status information of devices in a wireless network to the first end-user WAP-enabled device.

6. The method as in claim 5 wherein the network status information comprises log-on information.

7. The method as in claim 1 wherein the first end-user WAP-enabled device further comprises a wireless voice device.

8. The method as in claim 1 wherein the first end-user WAP-enabled device comprises a wireless data device.

9. A system for monitoring a wireless device comprising:
   a tracking unit operable to;
   monitor status information associated with a first end-user WAP-enabled device that comprises a browser;
   forward the status information to a second end-user wired device provided the second end-user wired device subscribes to the same subscription service as the first end-user WAP-enabled device, wherein the status information comprises a WAP enabled device identification.

10. The system as in claim 9 wherein the status information further comprises information selected from a group consisting of some combination of: an electronic serial number, a time of connection, a time of disconnection, a wireless switch identification number and a serving cell identification number.

11. The system as in claim 9 wherein the tracking unit is further operable to forward the status information to an address associated with the second end-user device.

12. The system as in claim 9 wherein the second end-user device is a wireless device.

13. The system as in claim 9 further comprising a network unit operable to forward network status information to the first end-user WAP-enabled device.

14. The system as in claim 13 wherein the network status information comprises log-on information.

15. The system as in claim 9 wherein the first end-user WAP-enabled device further comprises a wireless voice device.

16. The system as in claim 9 wherein the first end-user WAP-enabled device comprises a wireless data device.

17. A programmed memory operable to store one or more programs for:
   monitoring the status of information associated with a first end-user WAP-enabled device that comprises a browser;
   forwarding the status information to a second end-user wired device provided the second end-user wired device subscribes to the same subscription service as the first end-user WAP-enabled device, wherein the status information comprises a WAP enabled device identification.

18. The programmed memory as in claim 17 wherein the status information further comprises information selected from a group consisting of some combination of: an electronic serial number, a time of connection, a time of disconnection, a wireless switch identification number and a serving cell information number.

19. The programmed memory as in claim 17 wherein the one or more programs are further operable to forward the status information to an address associated with the second end-user device.

20. The programmed memory as in claim 17 wherein the second end-user device is a wireless device.

21. The programmed memory as in claim 17 wherein the one or more programs are further operable to forward network status information to the first end-user WAP-enabled device.

22. The programmed memory as in claim 21 wherein the network status information comprises log-on information.

23. The programmed memory as in claim 17 wherein the first end-user WAP-enabled device further comprises a wireless voice device.

24. The programmed memory as in claim 17 wherein the first end-user WAP-enabled device comprises a wireless data device.

25. The programmed memory as in claim 17 wherein the memory medium comprises a magnetic tape.

26. The programmed memory as in claim 17 wherein the memory medium comprises a floppy disk.

27. The programmed memory as in claim 17 wherein the memory medium comprises a compact disk ("CD").

28. The system as in claim 14 wherein the tracking unit comprises one or more devices selected from the group consisting of integrated circuits, microprocessor, digital signal processor, memory device, receiver and transmitter.

* * * * *